United States Patent [19]

LeFebvre et al.

[11] Patent Number: 5,384,943
[45] Date of Patent: Jan. 31, 1995

[54] SNAP-HOOK WITH SELF-LOCKING ROLLER

[75] Inventors: Patrick LeFebvre; Ludger Simond, both of Chamonix Mont Blanc, France

[73] Assignee: Etablissements Ludger Simond, S.A., Chamonix Mont Blanc, France

[21] Appl. No.: 97,224

[22] Filed: Jul. 27, 1993

[30] Foreign Application Priority Data

Jul. 29, 1992 [FR] France .................. 92 09673

[51] Int. Cl.⁶ .......................................... A44B 13/00
[52] U.S. Cl. .................................. 24/600.1; 24/599.5
[58] Field of Search ............... 24/573.5, 598.2, 599.5, 24/599.9, 600.1

[56] References Cited

U.S. PATENT DOCUMENTS 375,571  12/1887  Sears et al. .................. 24/599.9
1,392,260  9/1921  Schollar .
2,705,357  4/1955  Davick .
4,528,728  7/1985  Schmidt et al. ............... 24/599.5 X

FOREIGN PATENT DOCUMENTS 324714  4/1903  France .
1131305  2/1957  France .

Primary Examiner—James R. Brittain
Attorney, Agent, or Firm—William H. Eilberg

[57] ABSTRACT

A snap-hook comprises a roller rotatably mounted in a first curved area of a body and cooperating with a finger to prevent opening of the finger in all angular positions of the roller except for an unlocking position in which it enables opening of the finger. The locking roller is rotated by the attachment line. Traction on the line locks the snap-hook automatically. Unlocking is achieved by pivoting the snap-hook body relative to the line.

8 Claims, 4 Drawing Sheets

SNAP-HOOK WITH SELF-LOCKING ROLLER

TECHNICAL FIELD OF THE INVENTION

The present invention concerns quick-action connection devices usually called snap-hooks.

Snap-hooks are widely used in industry and for mountaineering, potholing and water sports. They usually comprise a curved generally C-shaped body made from metal rod with a longitudinal branch joining a first curved area ending at a first body end and a second curved area ending at a second, opposite body end. A closing finger is articulated to the first body end and can pivot between a closing position in which it bridges the first and second ends of the body and an open position in which the finger is pivoted away from the second end of the body to provide a gap for inserting attachment means.

A spring usually urges the finger into the closed position. The user can press the finger back towards its open position against the force of the return spring.

A conventional construction of this kind with the C-shape body closed by a pivoting finger combines excellent mechanical strength with great simplicity of manufacture and lightness in weight.

Attempts have been made to provide locking means to prevent pivoting of the finger towards its open position as a safety measure against unintentional opening of the snap-hook. Such locking means usually comprise a ring sliding on the free end of the finger and fitting over the free end of the body with the finger in the closed position. Opening the finger then entails first sliding the ring away from the free end of the body, after which the finger may be pivoted towards its open position. The problem is that, during closure of the snap-hook, the ring opposes complete closure of the finger and it is necessary first to move the ring away from the free end of the finger, so that the finger may close completely, after which the ring may fit over the free end of the body to effect the locking action. These multiple manipulations complicate the use of a snap-hook to the degree that users are often tempted to dispense with the locking means.

Conventional locking snap-hooks are not suitable under difficult conditions, as in rock climbing, for example, because operating them usually entails using both hands.

The document FR-A-324 714 describes a lifting hook whose body has a main part in the form of an open ring with an articulated finger and a secondary part in the form of a closed ring articulated about an axis of the main part. The secondary part locks the articulated finger. A structure of this kind is heavy and complicated and does not have the advantages of a C-shape body. Pivoting of the secondary part opens the finger, which is particularly dangerous in rock climbing. It would seem that both hands are needed to operate this device.

The document U.S. Pat. No. 1,392,260 describes another heavy and complicated structure which is devoid of the advantages of a C-shape body. Unintentional operation of the locking pushbutton inevitably opens the device, which is extremely dangerous. The provision of a pivoting closure roller in an open body does not offer sufficient mechanical strength, as traction separates the branches of the body. Two hands are also required to operate this device.

SUMMARY OF THE INVENTION

The problem to which the present invention is addressed is to design a snap-hook with a generally C-shape body closed by a locking finger in which the finger can be locked and unlocked by the deliberate pivoting of a locking member near the articulated end of the finger of the snap-hook so that traction forces applied to the snap-hook are taken by the body. In this case the locking member may be turned by one hand of the user, simultaneously with opening of the finger, and under difficult conditions in which the snap-hook is at arm's length with the opening facing away from the user, so that it may be attached to an attachment member as far away as possible.

A snap-hook of this kind does not require the use of both hands to open and/or close it and has mechanical strength, lightness and reliability characteristics that are necessary and sufficient to prevent opening of the finger under any conditions of use.

In particular, locking is assured while climbing, for example during a fall, despite vibration that may arise during any such use.

If the snap-hook is used with an attachment line, usually called a tape sling, the invention is further directed to achieving locking and unlocking by pivoting of the snap-hook body relative to the direction of the line which itself causes pivoting of the locking member. This facilitates locking and unlocking.

According to another aspect of the invention the snap-hook may be provided with means for holding the finger open and for automatically closing it immediately a traction load is applied to the snap-hook. This considerably facilitates use of the snap-hook, for example where the user must place the snap-hook on a rope very quickly or wishes to hook onto an attachment member at a relatively great distance, i.e. that can be reached only at arm's length. In this case all that is required is to pass the free end of the snap-hook body through an opening in the attachment member, after which pulling on the rope or on the snap-hook closes and locks the latter.

Another object of the invention is to provide a snap-hook of this kind which is double-locked, i.e. the locking member is itself locked in its locking position by preventing it from rotating on applying a load to the snap-hook. Unlocking then requires removal of the load followed by operation of the locking member to enable the finger to be opened. This increases safety.

To achieve these and other objects the snap-hook in accordance with the invention comprises:
- a curved body in the form of a rod and having a generally C-shape profile forming a longitudinal branch between a first curved area ending at a first body end and a second curved area ending at an opposite, second body end,
- a closure finger articulated to said first body end and able to pivot between a closing position in which it spans said first and second ends of said body and an open position in which said finger is pivoted away from said second end of said body,
- a roller rotatably mounted in said first curved area of said body and cooperating with said finger to prevent opening of said finger in all angular positions of said roller except for an unlocking position in which it enables opening of said finger, and
- means for forcibly turning said roller away from its unlocking position in normal operation so that opening of said finger requires rotation of said roller into said unlocking position beforehand.

In a preferred embodiment the roller comprises a peripheral groove partially enclosing the inside surface of the first curved area of the body so that the body itself guides rotation of the roller.

The roller may itself comprise an accessible external holding part for rotating it. Alternatively, the roller is provided with means for coupling it to a line adapted to lock the line and the roller together for rotation in the plane of the snap-hook body so that, pivoting of the snap-hook body relative to the direction of the line causes rotation of the roller relative to the snap-hook body.

In an improved embodiment the roller further comprises a locking rod sliding in a radial bore and projecting from the peripheral surface of the roller to engage in a locking hole in the body, the second end of the rod projecting into an opening in the roller so that it is pushed back in the radial bore by the line. A spring urges the locking rod towards the unlocked position.

BRIEF DESCRIPTION OF THE DRAWINGS

Other objects, features and advantages of the present invention will emerge from the following description of specific embodiments thereof given with reference to the accompanying drawings in which.

DESCRIPTION OF THE PREFERRED EMBODIMENTS

Figures 1, 2, 3:
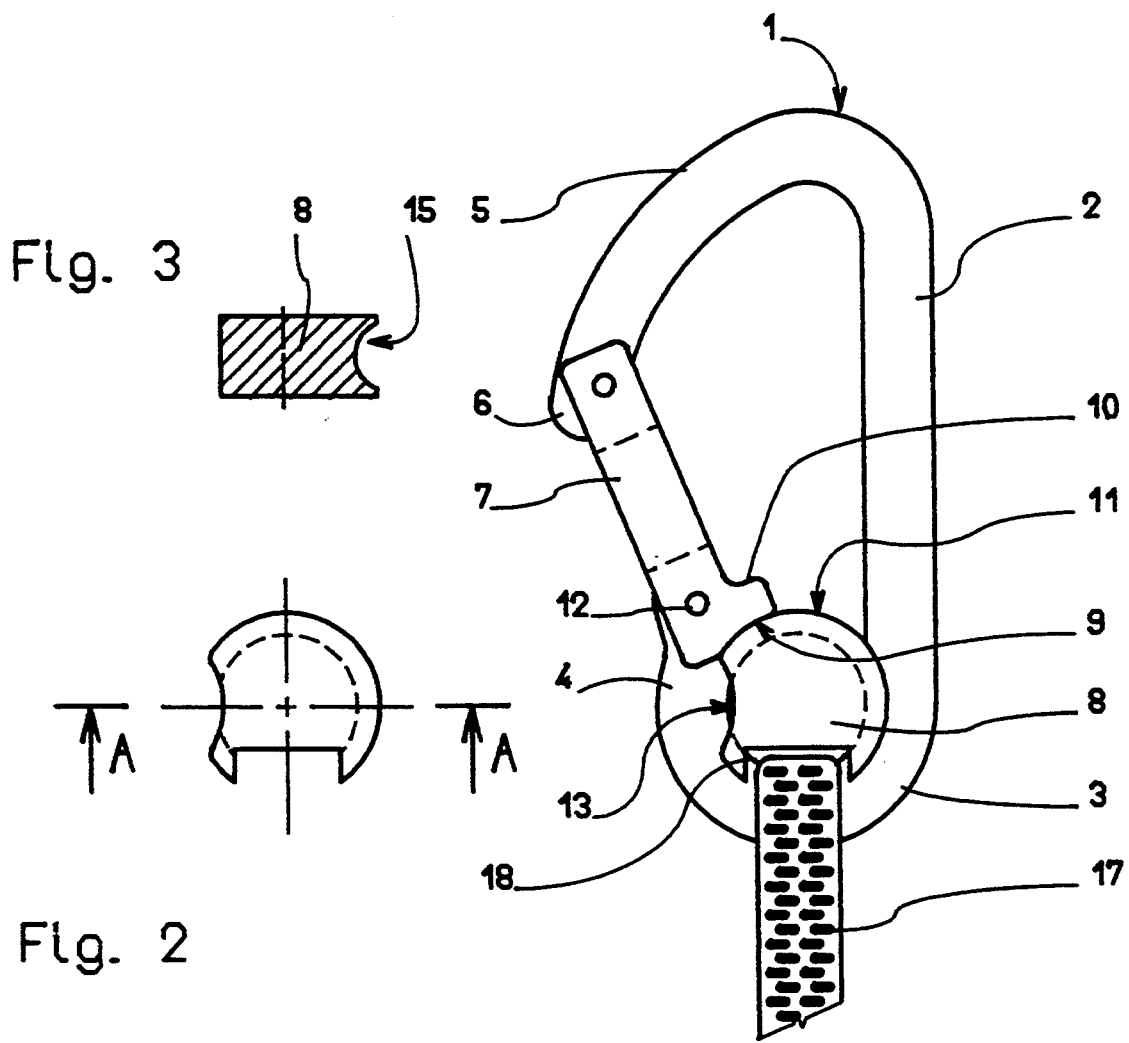
FIG. 1 is an elevation view of a snap-hook in a first embodiment of the present invention.
FIG. 2 is an elevation view of the locking roller of the FIG. 1 embodiment.
FIG. 3 is a view in cross-section on the line A—A in FIG. 2.

In the embodiment shown in FIG. 1 the snap-hook in accordance with the invention comprises a curved body 1 made from metal rod with a generally C-shape profile forming a longitudinal branch 2 joining a first curved area 3 ending at a first end 4 of the body and a second curved area 5 ending at a second, opposite end 6 of the body.

Figure 5:
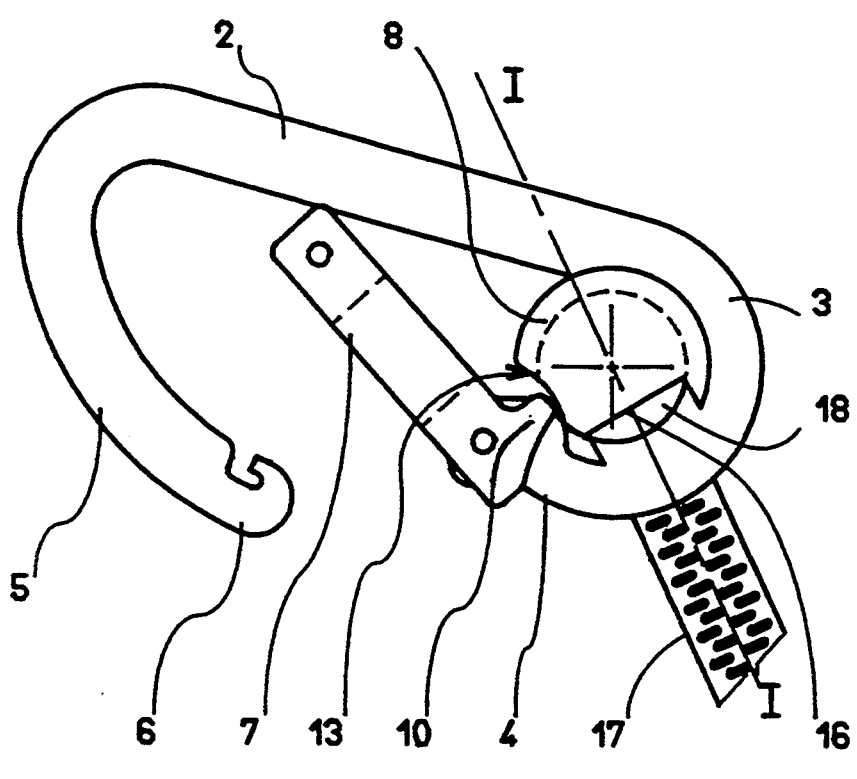
FIG. 5 is an elevation view of the snap-hook from FIG. 1 in the unlocked position.

A closure finger 7 is articulated to the first body end 4 and pivots between a closed position shown in FIG. 1 in which it spans the first and second body ends 4 and 6 and an open position shown in FIG. 5 in which the finger 7 is pivoted away from the second body end 6.

A locking roller 8 is rotatably mounted in the first curved area 3 of the body 1 and cooperates with the finger 7 to prevent the finger opening in all angular positions of the roller 8 except for an unlocking position in which the roller 8 allows the finger 7 to be opened.

The finger 7 comprises a locking surface 9, for example the surface of an excrescence 10 transverse to the longitudinal direction of the finger 7. The locking surface 9 abuts against the peripheral outside surface 11 of the roller 8 to prevent pivoting of the finger 7 about its pivot axis 12.

The roller 8 comprises a peripheral recess 13 which, when facing the locking surface 9 of the excrescence 10 of the finger 7, enables the finger to pivot towards its open position.

The position of the roller 8 when the peripheral recess 13 is facing the locking surface 9 of the finger is the unlocking position shown in FIG. 5. In this position the shape of the peripheral recess 13 allows the excrescence 10 to move in the recess when the finger 7 pivots.

The roller 8 is mounted in the first curved area 3 of the body 1 to rotate between the locking position shown in FIG. 1 and the unlocking position shown in FIG. 5.

Figure 4:
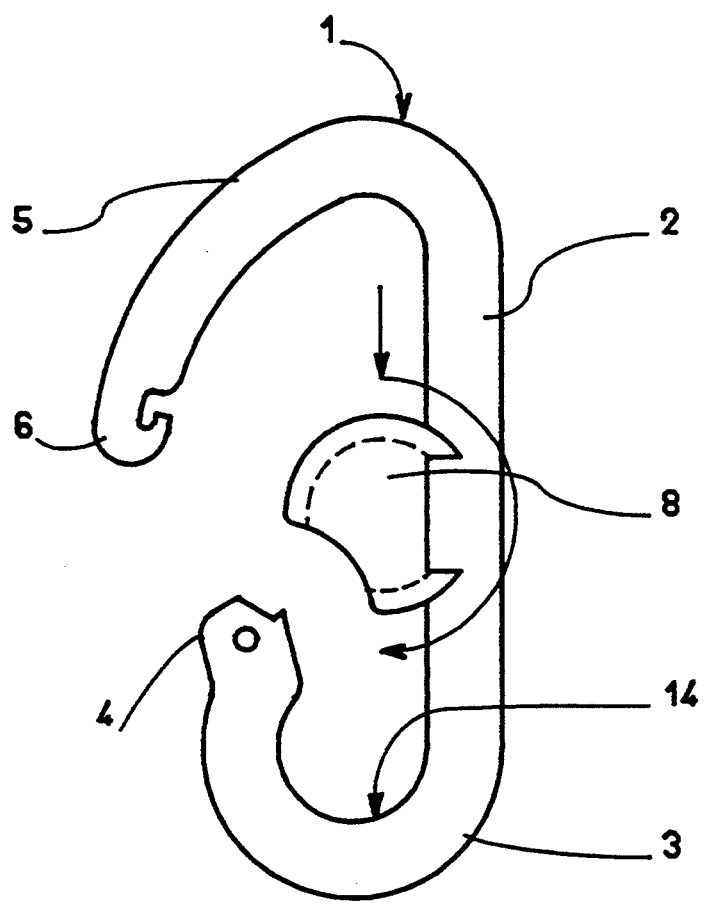
FIG. 4 shows how the roller is mounted in the body of the snap-hook from FIG. 1.

In the embodiment shown the first curved area 3 of the body 1 of the snap-hook has an interior surface 14 seen most clearly in FIG. 4 whose profile is substantially circular and subtends an angle exceeding 180°, an angle of approximately 210°, for example. The roller 8 comprises a peripheral groove 15 seen most clearly in FIG. 3 which partially envelops the interior surface 14 of the first curved area 3 of the body so that the first curved area 3 of the body guides rotation of the roller 8. The roller 8 is shaped to fit with limited clearance into the first curved area 3 of the body 1. To enable the roller 8 to be inserted into the housing formed by the first curved area 3 of the body the roller 8 comprises a flat 16 in the peripheral groove 15 which is located against the interior surface of the longitudinal branch 2 as shown in FIG. 4 in order to slide the roller 8 into the first curved area 3. The roller 8 is then turned to the locking position shown in FIG. 1 or the unlocking position shown in FIG. 5. In either of these positions the roller 8 is unable to escape from the first curved area 3 of the body, in which it rotates freely about an axis substantially perpendicular to the general plane of the body 1.

In this embodiment of FIGS. 1 through 5 the snap-hook is associated with a line 17 such as a tape sling connecting it to exterior attachment members (not shown). The roller 8 is provided with means for coupling it to said line 17. In this embodiment the coupling means comprise a notch 18 at the periphery of the roller 8. The line 17 passes through the notch 18 between the roller 8 and the body 1 of the snap-hook. The cross-section off the notch 18 is substantially the same as the cross-section of the line 17. The line 17 and the roller 8 are therefore locked together for rotation in the plane of the snap-hook body. Pivoting of the snap-hook body relative to the direction of the line, for example pivoting of the snap-hook as shown in FIG. 5 relative to the direction I—I of the line 17, rotates the roller 8 relative to the snap-hook body. Such rotation can move the roller 8 to the unlocking position shown in FIG. 5 or return the roller 8 to the locked position shown in FIG. 1.

In this way pivoting of the snap-hook body 1 relative to the line 17 automatically locks or unlocks the snap-hook.

Figure 6:
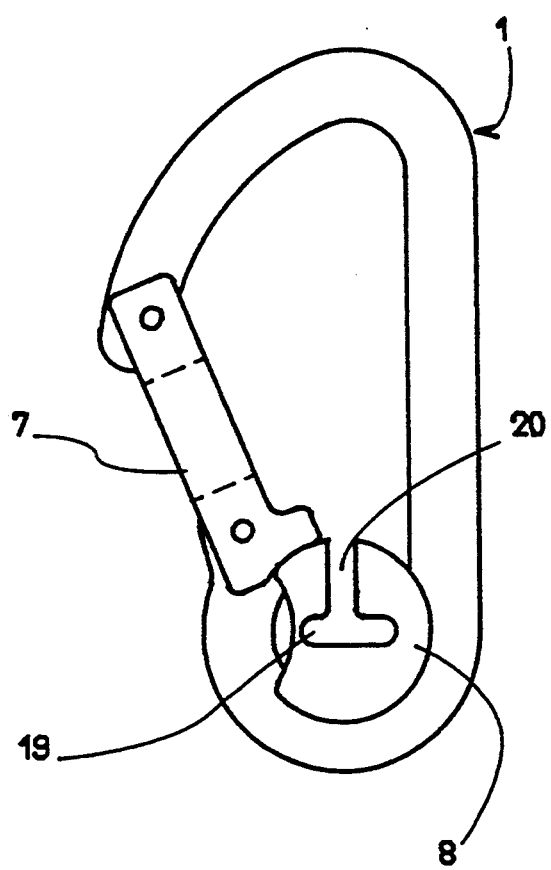
FIG. 6 is an elevation view of a snap-hook in a second embodiment of the invention.

FIG. 6 shows an embodiment in which the roller 8 comprises an eye 19 through which a line such as the line 17 of FIGS. 1 and 5 can pass. The eye 19 may be open to the exterior via a slot 20. In this embodiment a line 17 placed in the slot 19 can pivot the roller 8 as in the embodiment of FIGS. 1 and 5. However, the FIG. 6 embodiment reduces friction between the line 17 and the body 1 of the snap-fastener during pivoting between the locking and unlocking positions.

Figure 7:
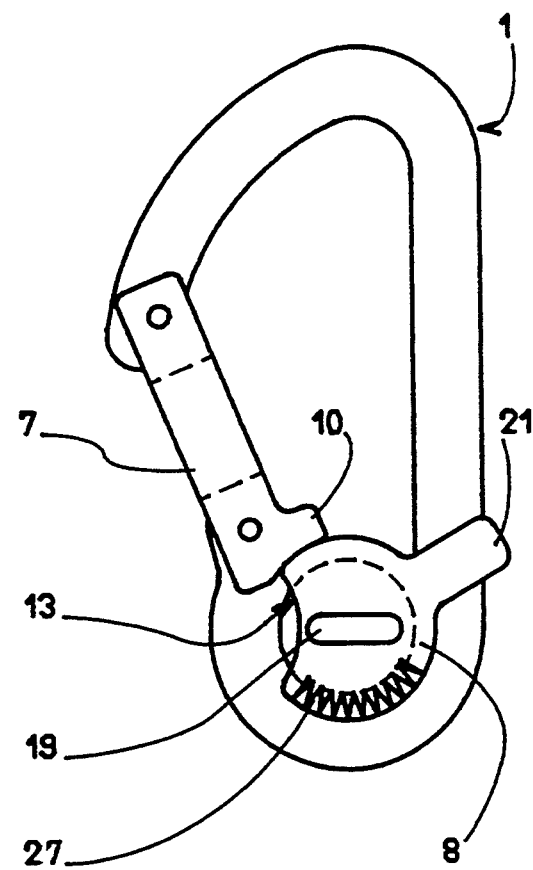
FIG. 7 is an elevation view of a snap-hook in a third embodiment of the invention.

FIG. 7 shows another embodiment in which the roller 8 has an accessible external holding part 21 for rotating it. A return spring 27 bearing against the body 1 and against the roller 8 urges the latter away from its unlocking position. Unlocking is thus effected by first using the external holding part 21 to turn the roller 8 to the unlocking position with the peripheral recess 13 facing the excrescence 10 on the finger 7, whereupon the finger 7 can pivot towards its open position. When the finger 7 is released the spring 27 returns the roller 8 to the locking position.

Figure 8:
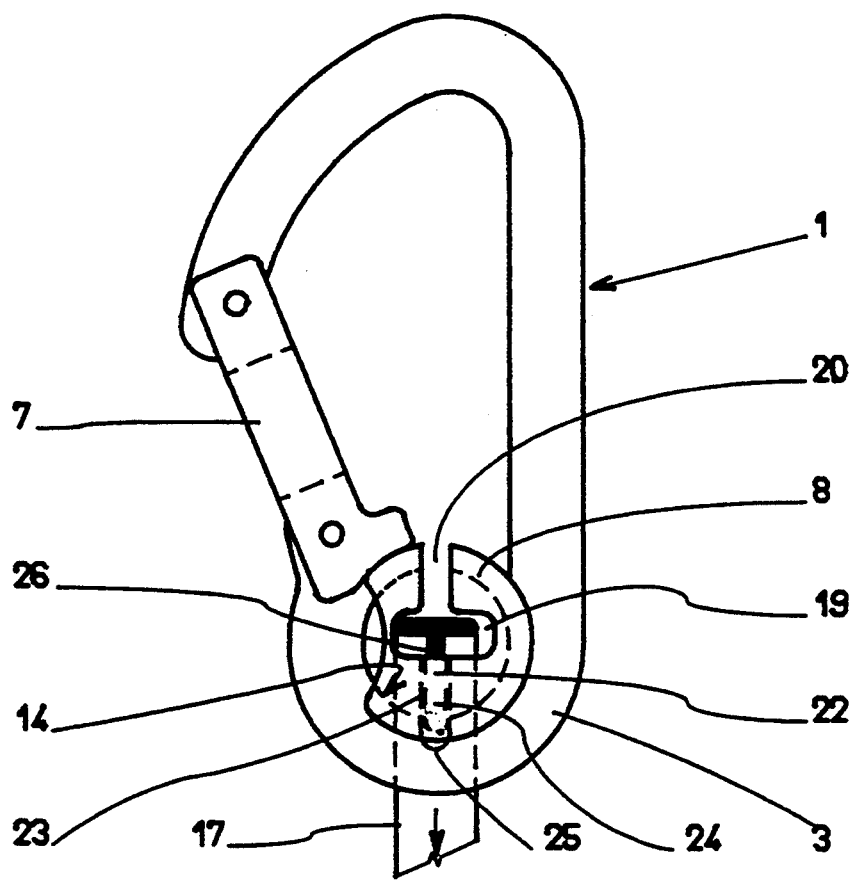
FIG. 8 is an elevation view of a snap-hook in a fourth embodiment of the invention.
Figure 9:
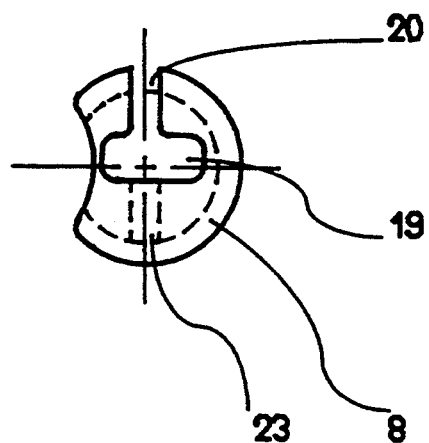
FIG. 9 is an elevation view of the locking roller from the FIG. 8 snap-hook.

FIG. 7 also shows an eye 19 through which the line 17 may be passed. FIG. 8 shows another embodiment providing double-locking of the snap-hook. The roller 8 comprises an eye 19 and a slot 20 as in the FIG. 6 embodiment. The roller 8 further comprises a locking rod 22 sliding in a radial bore 23 opening onto the peripheral surface of the roller 8 and into the eye 19 in the roller 8. One end 24 of the locking rod 22 is designed to project from the peripheral surface of the roller 8 to enter a locking hole 25 in the interior surface 14 of the first curved area 3 of the body and thus prevent rotation of the roller 8. The second end 26 of the locking rod 22 projects into the eye 19 in the roller 8 and is adapted to be pushed back into the radial bore 23 by the line 17 when the latter is under tension. A spring (not shown in the figure) urges the locking rod 22 towards the eye 19 to remove the end 24 from the locking hole 25. This spring thus enables rotation of the roller 8.

In all embodiments the peripheral recess 13 in the roller 8 may advantageously be shaped as an abutment to hold the finger 7 in the open position when the roller 8 is turned in the unlocking direction. This way, when the user holds the roller 8 in the unlocking position, the finger is automatically held in the open position, facilitating passage of the free end 6 of the snap-hook body into an attachment ring, the finger 7 closing automatically as soon as the user releases the roller 8.

The present invention is not limited to the embodiments explicitly described but encompasses various variants and generalizations thereof within the scope of the following claims.

We claim:

1. Snap-hook having the general shape of a closed ring, comprising:
    a curved body in the form of a rod and having a generally C-shaped profile forming a longitudinal branch between a first curved area ending at a first body end and a second curved area ending at an opposite, second body end,
    a closure finger articulated to said first body end and able to pivot between a closing position in which said finger spans said first and second ends of said body and an open position in which said finger is pivoted away from said second end of said body,
    a roller rotatably mounted in said first curved area of said body and cooperating with said finger to prevent opening of said finger in all angular positions of said roller except for an unlocking position in which said roller enables opening of said finger, and
    means for forcibly turning said roller away from its unlocking position in normal operation so that opening of said finger requires rotation of said roller into said unlocking position beforehand,
    wherein said roller comprises a peripheral groove partially enveloping the interior surface of said first curved area of said body so that said first curved area of said body guides rotation of said roller.

2. Snap-hook according to claim 1 wherein:
    said snap-hook is associated with a line for connecting it to external attachment means, and
    said roller is provided with means for coupling it to said line so that said line and said roller are locked together in rotation in the plane of said snap-hook body so that pivoting of said snap-hook body relative to the direction of said line causes rotation of said roller relative to said snap-hook body.

3. Snap-hook according to claim 2 wherein said coupling means comprise an eye in said roller through which said line passes.

4. Snap-hook according to claim 1 wherein:
    said finger comprises a locking surface abutting against the peripheral outside surface of said roller to prevent it pivoting, and
    said roller comprises a peripheral recess enabling pivoting of said finger when said recess faces said locking surface of said finger in its unlocking position.

5. Snap-hook according to claim 4 wherein said peripheral recess in said roller is shaped to form an abutment to hold said finger in its open position when said roller is rotated in the unlocking direction.

6. Snap-hook having the general shape of a closed ring, comprising:
    a curved body in the form of a rod and having a generally C-shaped profile forming a longitudinal branch between a first curved area ending at a first body end and a second curved area ending at an opposite, second body end,
    a closure finger articulated to said first body end and able to pivot between a closing position in which said finger spans said first and second ends of said body and an open position in which said finger is pivoted away from said second end of said body,
    a roller rotatably mounted in said first curved area of said body and cooperating with said finger to prevent opening of said finger in all angular positions of said roller except for an unlocking position in which said roller enables opening of said finger, and
    means for forcibly turning said roller away from its unlocking position in normal operation so that opening of said finger requires rotation of said roller into said unlocking position beforehand,
    wherein said roller has an accessible external holding part for rotating said roller, and a return spring bearing on said body and on said roller to rotate said roller away from its unlocking position.

7. Snap-hook having the general shape of a closed ring, comprising:
    a curved body in the form of a rod and having a generally C-shaped profile forming a longitudinal branch between a first curved area ending at a first body end and a second curved area ending at an opposite, second body end,
    a closure finger articulated to said first body end and able to pivot between a closing position in which said finger spans said first and second ends of said body and an open position in which said finger is pivoted away from said second end of said body,
    a roller rotatably mounted in said first curved area of said body and cooperating with said finger to prevent opening of said finger in all angular positions of said roller except for an unlocking position in which said roller enables opening of said finger, and means for forcibly turning said roller away from its unlocking position in normal operation so that opening of said finger requires rotation of said roller into said unlocking position beforehand, wherein said snap-hook is associated with a line for connecting said snap-hook to external attachment means, and said roller is provided with means for coupling said roller to said line so that said line and said roller are locked together in rotation in the plane of said snap-hook body so that pivoting of said snap-hook body relative to the direction of said line causes rotation of said roller relative to said snap-hook body, wherein said coupling means comprise a notch at the periphery of said roller, and said line passes through said notch between said roller and said snap-hook body.

8. Snap-hook having the general shape of a closed ring, comprising:

a curved body in the form of a rod and having a generally C-shaped profile forming a longitudinal branch between a first curved area ending at a first body end and a second curved area ending at an opposite, second body end, a closure finger articulated to said first body end and able to pivot between a closing position in which said finger spans said first and second ends of said body and an open position in which said finger is pivoted away from said second end of said body, a roller rotatably mounted in said first curved area of said body and cooperating with said finger to prevent opening of said finger in all angular positions of said roller except for an unlocking position in which said roller enables opening of said finger, and means for forcibly turning said roller away from its unlocking position in normal operation so that opening of said finger requires rotation of said roller into said unlocking position beforehand, wherein said snap-hook is associated with a line for connecting said snap-hook to external attachment means, and said roller is provided with means for coupling said roller to said line so that said line and said roller are locked together in rotation in the plane of said snap-hook body so that pivoting of said snap-hook body relative to the direction of said line causes rotation of said roller relative to said snap-hook body, wherein said coupling means comprise an eye in said roller through which said line passes, wherein said roller further comprises a locking rod sliding in a radial bore opening onto the peripheral surface of said roller and into said eye in said roller, and wherein one end of said locking rod projects from said peripheral surface of said roller into a locking hole on the interior surface of said first curved area of said body to prevent rotation of said roller, wherein a second end of said locking rod projects into said eye in said roller to be pushed back into said radial bore by said line, and wherein a spring urges said locking rod towards said eye in said roller to extract the end of said locking rod from said locking hole and free said roller to rotate.

* * * * *